US009643087B2

(12) United States Patent
Naoi et al.

(10) Patent No.: US 9,643,087 B2
(45) Date of Patent: May 9, 2017

(54) INFORMATION STORAGE MEDIUM AND GAME SYSTEM HAVING OPERATION INPUT OF SEQUENTIALLY SELECTED ELEMENTS

(71) Applicant: BANDAI NAMCO Entertainment Inc., Tokyo (JP)

(72) Inventors: Yoshinori Naoi, Kawasaki (JP); Ryuuji Oodate, Hiratsuka (JP); Kousei Ikeda, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 211 days.

(21) Appl. No.: 14/468,487

(22) Filed: Aug. 26, 2014

(65) Prior Publication Data
US 2015/0080073 A1  Mar. 19, 2015

(30) Foreign Application Priority Data
Sep. 5, 2013 (JP) ................. 2013-183856

(51) Int. Cl.
*A63F 13/58* (2014.01)
*A63F 13/822* (2014.01)
*A63F 13/2145* (2014.01)

(52) U.S. Cl.
CPC .......... *A63F 13/58* (2014.09); *A63F 13/2145* (2014.09); *A63F 13/822* (2014.09)

(58) Field of Classification Search
CPC ..... A63F 13/58; A63F 13/2145; A63F 13/822
See application file for complete search history.

(56) References Cited

U.S. PATENT DOCUMENTS

| 2014/0080599 A1* | 3/2014 | Shimono ................. A63F 13/00 463/31 |
| 2014/0274414 A1* | 9/2014 | Annunziata ............. A63F 13/56 463/42 |
| 2015/0336007 A1* | 11/2015 | Ohashi .................. A63F 13/822 463/473 |
| 2016/0023115 A1* | 1/2016 | Takeda ................... A63F 13/58 463/31 |

FOREIGN PATENT DOCUMENTS

JP      2012-061059 A    3/2012

* cited by examiner

*Primary Examiner* — Corbett B Coburn
(74) *Attorney, Agent, or Firm* — Posz Law Group, PLC

(57) ABSTRACT

A game system is designed so that, when an operation input that sequentially selects a plurality of player characters from a plurality of player characters placed in a character selection area has been performed, and it has been determined that the sequentially selected player characters satisfy a selection allowance condition that is set based on an attribute, each of the sequentially selected player characters attacks an enemy character, and the player character that has attacked the enemy character is deleted from the character selection area. The same number of player character as the player character deleted from the character selection area is additionally placed in the character selection area, and an attribute of each player character that is additionally placed in the character selection area is determined according to a given rule.

13 Claims, 10 Drawing Sheets

FIG.8A

| COMBINATION | COEFFICIENT $C_c$ |
|---|---|
| A, B | 1.5 |
| B, C | 1.2 |
| A, C | 1.0 |

FIG.8B

| ORDER | COEFFICIENT $C_o$ |
|---|---|
| FIRST | 0.7 |
| SECOND | 1.0 |
| THIRD | 1.3 |

# INFORMATION STORAGE MEDIUM AND GAME SYSTEM HAVING OPERATION INPUT OF SEQUENTIALLY SELECTED ELEMENTS

Japanese Patent Application No. 2013-183856 filed on Sep. 5, 2013, is hereby incorporated by reference in its entirety.

BACKGROUND OF THE INVENTION

The present invention relates to an information storage medium and a game system.

A game system has been known that implements a battle game in which decks and cards are set based on input information and a player character attacks an enemy character (see JP-A-2012-061059, for example). In such a game system, the attack capability of each player character is determined based on the attribute set to the player character.

In a known game system, each player character has a particular attribute, and the attribute set to each player character does not change during the game. Specifically, even when the player wants to select his desired character as a player character, the player needs to select a player character while giving priority to the attribute in order to proceed with the game. Therefore, many players may set a similar character as a player character to proceed with the game, and the preference of a player may not have been reflected in the game.

SUMMARY

The invention provides an information storage medium and a game system that can implement a novel battle game that allows a player to set his desired character as a player character, and utilizes the attribute of the player character.

According to a first aspect of the invention, there is provided a computer-readable information storage medium for implementing a battle game in which a player character selected by a player attacks an enemy character, the information storage medium storing a program that causes a computer to function as:

a placement section that places a player character among the predetermined number of player characters in a character selection area;

an attribute setting section that sets an attribute of each player character that is placed in the character selection area;

an attack execution section that determines whether or not a plurality of player characters sequentially selected from the player characters placed in the character selection area satisfy a selection allowance condition that is set based on the attribute when an operation input that sequentially selects the plurality of player characters has been performed, and causes each of the plurality of player characters to make an attack according to the attribute when it has been determined that the selection allowance condition is satisfied; and a deletion section that deletes a player character that has attacked the enemy character from the character selection area, the placement section selecting the same number of player character as the player character deleted from the character selection area from the predetermined number of player characters excluding the player characters placed in the character selection area, and additionally placing the selected player character in the character selection area, and the attribute setting section setting an attribute to each player character that is additionally placed in the character selection area according to a given rule.

According to a second aspect of the invention, there is provided a game system that implements a battle game in which a player character selected by a player attacks an enemy character, the game system including:

a placement section that places a player character among the predetermined number of player characters in a character selection area;

an attribute setting section that sets an attribute of each player character that is placed in the character selection area;

an attack execution section that determines whether or not a plurality of player characters sequentially selected from the player characters placed in the character selection area satisfy a selection allowance condition that is set based on the attribute when an operation input that sequentially selects the plurality of player characters has been performed, and causes each of the plurality of player characters to make an attack according to the attribute when it has been determined that the selection allowance condition is satisfied; and a deletion section that deletes a player character that has attacked the enemy character from the character selection area, the placement section selecting the same number of player character as the player character deleted from the character selection area from the predetermined number of player characters excluding the player characters placed in the character selection area, and additionally placing the selected player character in the character selection area, and the attribute setting section setting an attribute to each player character that is additionally placed in the character selection area according to a given rule.

BRIEF DESCRIPTION OF THE SEVERAL VIEWS OF THE DRAWING

FIGS. 8A and 8B are tables for describing calculation of the total attack capability.

Figure 1:
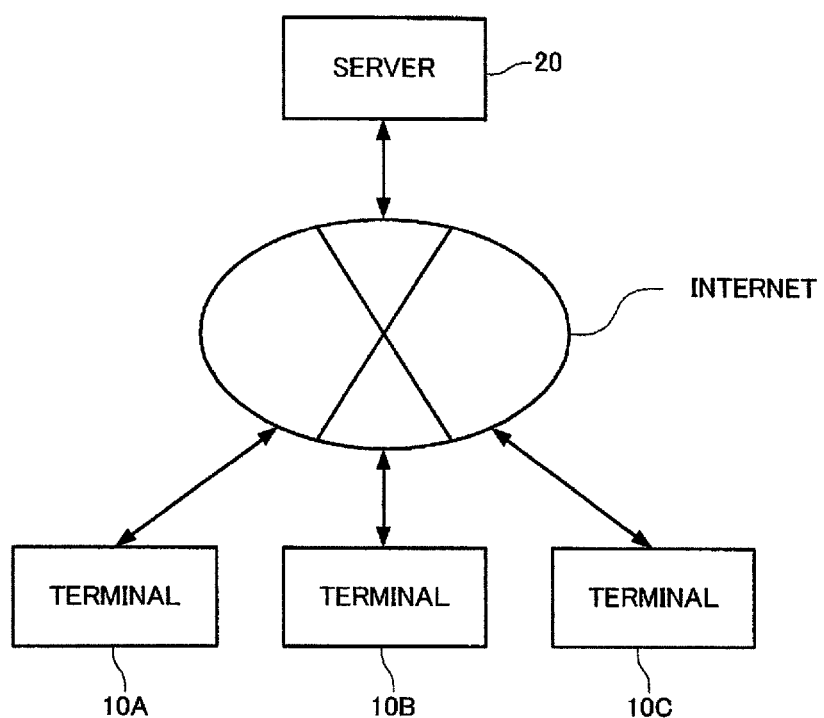
FIG. 1 illustrates a game system according to one embodiment of the invention.

DETAILED DESCRIPTION OF THE EMBODIMENT (1) One embodiment of the invention relates to a computer-readable information storage medium for implementing a battle game in which a player character selected by a player attacks an enemy character, the information storage medium storing a program that causes a computer to function as:

a placement section that places a player character among the predetermined number of player characters in a character selection area;

an attribute setting section that sets an attribute of each player character that is placed in the character selection area;

an attack execution section that determines whether or not a plurality of player characters sequentially selected from the player characters placed in the character selection area satisfy a selection allowance condition that is set based on the attribute when an operation input that sequentially selects the plurality of player characters has been performed, and causes each of the plurality of player characters to make an attack according to the attribute when it has been determined that the selection allowance condition is satisfied; and a deletion section that deletes a player character that has attacked the enemy character from the character selection area, the placement section selecting the same number of player character as the player character deleted from the character selection area from the predetermined number of player characters excluding the player characters placed in the character selection area, and additionally placing the selected player character in the character selection area, and the attribute setting section setting an attribute to each player character that is additionally placed in the character selection area according to a given rule.

Another embodiment of the invention relates to a game system that implements a battle game in which a player character selected by a player attacks an enemy character, the game system including the sections described above.

According to the above embodiments, it is possible to realize a novel battle game in which a player character attacks an enemy character by sequentially selecting a plurality of player characters that satisfy a selection allowance condition that is set based on the attribute from a plurality of player characters for which an attribute is reset each time the player character is placed in the character selection area.

(2) In each of the information storage medium and the game system, the attack execution section may change an attack capability of each of the plurality of player characters that have been sequentially selected according to an order in which the plurality of player characters have been sequentially selected.

This makes it possible to realize a battle game in which an enemy character is attacked with an attack capability according to the order in which the plurality of player characters have been sequentially selected.

(3) In each of the information storage medium and the game system, the attack execution section may calculate the attack capability of each of the plurality of player characters that have been sequentially selected according to the number of turns that have elapsed until each of the plurality of player characters has been selected after each of the plurality of player characters was placed in the character selection area.

This makes it possible to realize a battle game in which an enemy character is attacked with an attack capability according to the number of turns that have elapsed until each of the plurality of player characters has been selected after each of the plurality of player characters was placed in the character selection area.

(4) In each of the information storage medium and the game system, when the same attribute has been successively set to the same player character for the predetermined number of times, the attack execution section may increase the attack capability of the player character.

This makes it possible to realize a battle game in which the attack capability changes according to the number of times in which the same attribute has been successively set to the same player character.

(5) In each of the information storage medium and the game system, the placement section may place the player character that is additionally placed in the character selection area in the vicinity of a player character that is placed in the character selection area and has the same attribute as the attribute set to the player character that is additionally placed in the character selection area.

This makes it possible for the player to easily perform an operation input to sequentially select player characters that satisfy the selection allowance condition.

(6) In each of the information storage medium and the game system, an attribute that increases the attack capability may be specified for each player character, and the attribute setting section may set the attribute that increases the attack capability to the player character that is additionally placed in the character selection area when the number of player characters that have been sequentially selected is equal to or larger than the predetermined number.

This makes it possible for the player to increase the attack capability by selecting a larger number of player characters that satisfy the selection allowance condition.

(7) In each of the information storage medium and the game system, the attack execution section may cancel selection of the plurality of player characters when an operation input that designates a position at which no player character is present has been performed after the plurality of player characters have been sequentially selected.

This makes it possible for the player to easily cancel the operation input that has sequentially selected the player characters.

(8) In the information storage medium, the program may cause the computer to further function as a display control section that displays the predetermined number of attributes that are to be set to the player characters that are additionally placed in the character selection area in advance, and the attribute setting section may change the displayed attributes and/or the attributes to be set when a given game condition has been satisfied during the battle game.

The game system may further include a display control section that displays the predetermined number of attributes that are to be set to the player characters that are additionally placed in the character selection area in advance, and the attribute setting section may change the displayed attributes and/or the attributes to be set when a given game condition has been satisfied during the battle game.

This makes it possible to further improve the game playability by displaying the attribute to be set to the player character that is additionally placed in the character selection area, and changing the attribute depending on the status of the game.

Exemplary embodiments of the invention are described below. Note that the following exemplary embodiments do not unduly limit the scope of the invention as stated in the claims. Note that all of the elements described below in connection with the following exemplary embodiments should not be necessarily taken as essential elements of the invention.

1. Configuration

FIG. 1 illustrates a network system (game system) according to one embodiment of the invention. The network system includes a plurality of terminals 10 (game devices) and a server 20 (server system). As illustrated in FIG. 1, the network system is configured so that the server 20 that provides a service and the terminals 10 can be connected to a network.

The server 20 is an information processing device that provides a service that allows a plurality of users (players) to communicate. In one embodiment of the invention, the server 20 provides a community-type service referred to as a social networking service (SNS). Specifically, the server 20 transmits user information (e.g., user name, diary, notice information, and status of game field) to a user who has logged in and another user who maintains a friendship with the user so that the users can communicate. The server 20 may provide the service to only users who have registered themselves as a member. The server 20 may be implemented by a single server, or may be implemented by a plurality of servers (e.g., authentication server, game processing server, communication server, accounting server, and database server).

The server 20 provides an online game service (social game) in response to a request from the terminal 10. In one embodiment of the invention, the terminal 10 executes a game program, and the server 20 manages account information of each player, information about the results of the game executed by the terminal 10, game parameters, game elements (e.g., player character and item) that can be used in the game, and an in-game money that can be used in the game, and the like.

The terminal 10 is an information processing device such as a portable terminal (e.g., smartphone, mobile phone, or portable game machine), a personal computer (PC), a game device, or an image generation device, and can connect to the server 20 via a network (e.g., Internet (WAN) and LAN). The terminal 10 and the server 20 may be connected via a cable communication channel or a wireless communication channel.

Figure 2:
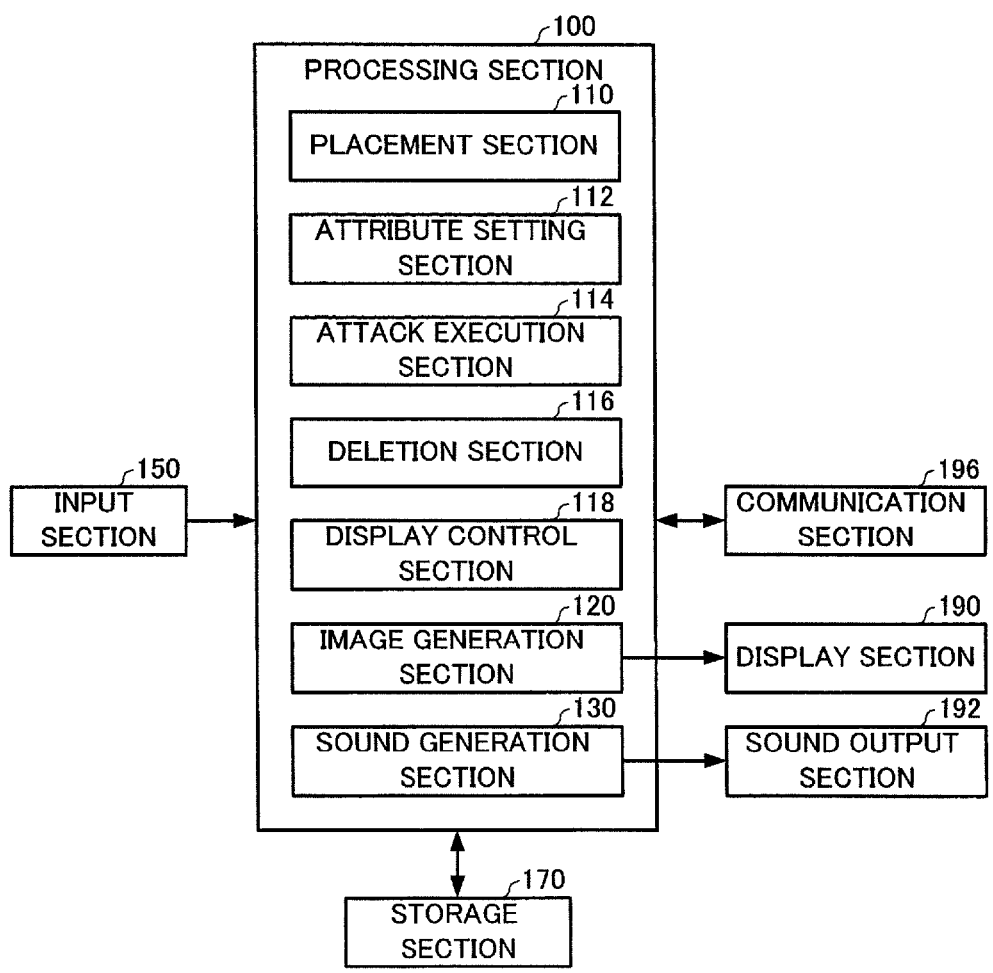
FIG. 2 illustrates an example of a functional block diagram of a terminal according to one embodiment of the invention.

FIG. 2 illustrates an example of a functional block diagram of a game device (terminal 10) according to one embodiment of the invention. Note that the game device according to one embodiment of the invention may have a configuration in which some of the elements (sections) illustrated in FIG. 2 are omitted.

An input section 150 is a device that detects information (input information) input by the player, and outputs the information (operation input) input by the player to a processing section 100. The function of the input section 150 may be realized by an input device such as a touch panel (touch panel display), a touch pad, a mouse, a direction key or button, or a keyboard.

A storage section 170 stores a program that causes a computer to function as each section of the processing section 100, and various types of data, and serves as a work area for the processing section 100. The function of the storage section 170 may be realized by a hard disk, a RAM, or the like.

A display section 190 outputs a game image generated by the processing section 100. The function of the display section 190 may be realized by a display (e.g., LCD, CRT, or touch panel display).

A sound output section 192 outputs sound generated by the processing section 100. The function of the sound output section 192 may be realized by a speaker, a headphone, or the like.

A communication section 196 performs various types of control for communicating with the server 20. The function of the communication section 196 may be realized by hardware such as a processor or a communication ASIC, a program, or the like.

The game device may receive a program (that causes a computer to function as each section of the processing section 100) or data that are stored in an information storage medium or a storage section included in the server 20 via a network, and store the received program or data in the storage section 170. A case where the game device operates based on a program or data received from the server is intended to be included within the scope of the invention.

The processing section 100 (processor) performs a game process, an image generation process, a sound generation process, and the like based on the information input from the input section 150, a program, data received through the communication section 196, and the like. The function of the processing section 100 may be realized by hardware such as a processor (e.g., CPU or DSP) and an ASIC (e.g., gate array), or a program.

The processing section 100 includes a placement section 110, an attribute setting section 112, an attack execution section 114, a deletion section 116, a display control section 118, an image generation section 120, and a sound generation section 130.

The placement section 110 places a player character among a plurality of player characters that can be used by the player in a game field (character selection area). The placement section 110 also places an enemy character in the game field.

The attribute setting section 112 sets an attribute of each player character placed in the game field (determines an attribute set to each player character).

The attack execution section 114 determines whether or not a plurality of player characters sequentially selected from the player characters placed in the game field satisfy a selection allowance condition that is set based on the attribute when an operation input that sequentially selects the plurality of player characters has been input to the input section 150, and causes each of the plurality of sequentially selected player characters to make an attack on the enemy character according to the attribute when it has been determined that the selection allowance condition is satisfied. Specifically, the attack execution section 114 performs a control process that cause each of the selected player characters to make a motion to attack the enemy character, a process to display an image associated with the attack, a process to decrement the strength value (hit point) of the enemy character based on the attack capability of each of the selected player character, and the like. The attack execution section 114 causes the enemy character to attack the player character when the enemy character's turn to make an attack has been reached.

The attack execution section 114 may determine that the selection allowance condition is satisfied when a plurality of player characters that have been sequentially selected have the same attribute, or may determine that the selection allowance condition is satisfied when the order of the attributes set to a plurality of player characters that have been sequentially selected matches a specific order.

The attack execution section 114 may perform a process to calculate the total attack capability based on the attack capability of each player character that has been sequentially selected, and causes each player character to attack the enemy character according to the calculated total attack capability. Specifically, the attack execution section 114 may perform a process to decrement the strength value of the enemy character according to the calculated total attack capability.

The attack execution section 114 may vary the total attack capability according to the order in which the player characters have been sequentially selected.

The attack execution section 114 may calculate the attack capability of each player character that has been sequentially selected according to the order in which each player character has been sequentially selected, and calculate the total attack capability based on the calculated attack capability of each player character.

The attack execution section 114 may calculate the attack capability of each player character that has been sequentially selected according to the number of turns (the number of times the player character attacks the enemy character) that have elapsed until each player character has been selected after each player character was placed in the game field, and calculate the total attack capability based on the calculated attack capability of each player character. One turn elapses each time the player character attacks the enemy character based on an operation input performed by the player. The number of remaining turns until the enemy character starts an attack is decremented by 1 when one turn elapses.

The attack execution section 114 may increase the attack capability of the player character when the same attribute has been successively set to the player character for the predetermined number of times.

The attack execution section 114 may cancel selection of the player characters when an operation input that designates a position at which no player character is present has been input to the input section 150 after the player characters have been sequentially selected.

The deletion section 116 deletes the player character that has attacked the enemy character from the game field. The placement section 110 selects the same number of player character as the player character deleted from the game field from the player characters excluding the player characters placed in the game field, and additionally places the selected player characters in the game field, and the attribute setting section 112 sets an attribute to each of the player characters additionally placed in the game field according to a given rule. Note that the attribute may be set according to the given rule by determining the attribute by a lottery, or determining the attribute according to a predetermined attribute order, for example.

The placement section 110 may place the player character that is additionally placed in the game field in the vicinity of the player character that is placed in the game field and has the same attribute as the attribute set to the player character that is additionally placed in the game field.

When the attribute that increases the attack capability is specified for each player character, the attribute setting section 112 may set the attribute that increases the attack capability to the player character that is additionally placed in the game field when the number of player characters that have been sequentially selected is equal to or larger than the predetermined number.

The display control section 118 performs a display control process to display an image that represents the attribute set to each player character within the game field so that the image is linked to each player character.

The display control section 118 may display the predetermined number of attributes that are to be set to each player characters that are additionally placed in the game field. The attribute setting section 112 may change the displayed attributes and/or the attributes to be set when a given game condition has been satisfied during the battle game.

The image generation section 120 performs a drawing process based on the results of various processes performed by the processing section 100 to generate a game image (i.e., a game image that represents the game field), and outputs the generated game image to the display section 190. The image generation section 120 may generate an image (three-dimensional image) viewed from a virtual camera (given viewpoint) within an object space (game field).

The sound generation section 130 performs a sound generation process based on the results of various processes performed by the processing section 100 to generate game sound such as background music (BGM), effect sound, and voice, and outputs the generated game sound to the sound output section 192.

The processing section 100 transmits information for notifying the server 20 that the game has started to the server 20 when the game has started, transmits placement information about the placement area (identification information and coordinate information about each game element placed in the placement area) to the server 20 when the game element has been placed in the placement area, and transmits game result information about the game results and various game parameters to the server 20 when the game has ended.

The server 20 updates the data that is linked to each player based on the game result information transmitted from the game device (terminal 10).

The game system according to one embodiment of the invention may be realized by a server system. The server system may be realized by a single server, or may be realized by a plurality of servers (e.g., authentication server, game processing server, communication server, accounting server, and database server). In this case, the server system performs the process performed by each section of the processing section 100 (placement process, attribute setting process, attack execution process, deletion process, and display control process) based on the input information (data input to an input section of an information processing terminal) transmitted from one or more information processing terminals (e.g., smartphone, mobile phone, or portable game machine) connected to the server system through a network to generate image generation data for generating an image, and transmits the generated image generation data to each information processing terminal. Note that the term "image generation data" used herein refers to data for displaying an image generated by the method according to one embodiment of the invention on each information processing terminal. The image generation data may be image data, or may be data that is used when each information processing terminal generates an image (e.g., object data and game processing result data).

2. Method

The method according to one embodiment of the invention is described below with reference to the drawings.

Figure 3:
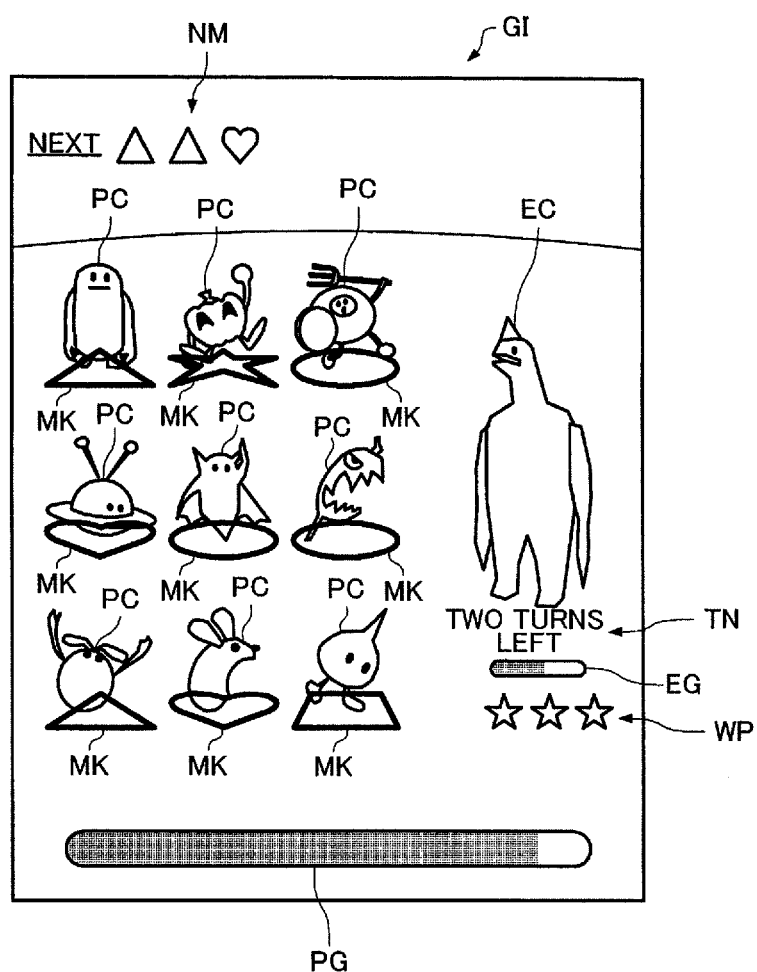
FIG. 3 illustrates an example of a game screen generated by a game system according to one embodiment of the invention.

FIG. 3 is a view illustrating an example of a game screen (game image) that is generated by the game system according to one embodiment of the invention. The game screen illustrated in FIG. 3 is displayed when the player battles with an enemy character. A game screen GI is displayed on the display section (touch panel) of the terminal 10. The player can perform an operation input by touching the touch panel with a fingertip, a touch pen, or the like (touch operation).

A plurality of player characters PC and an enemy character EC placed in the game field (character selection area) are displayed within the game screen illustrated in FIG. 3. In the example illustrated in FIG. 3, nine player characters PC and one enemy character EC are placed in the game field. In one embodiment of the invention, nine player characters PC among twelve player characters selected by the player as characters used in the game are placed in the game field. An attribute mark MK (i.e., an image that represents an attribute) that represents an attribute set to each player character PC is displayed at the position at which each player character PC is placed. In the game according to one embodiment of the invention, an attribute among five attributes "circle," "triangle," "square," "star," and "heart" is set to each player character PC.

A strength gauge PG that represents the strength value of the player character PC (i.e., the total strength value of each player character PC placed in the game field), a strength gauge EG that represents the strength value of the enemy character EC, and the number of remaining turns TN until the enemy character EC starts an attack, are displayed within the game screen GI. An image NM that represents the attribute that is to be set to the player character PC that is additionally placed in the game field is also displayed within the game screen GI. In the example illustrated in FIG. 3, three (i.e., predetermined number of) attributes are displayed in advance as the attribute that is to be set to the player characters PC that are additionally placed in the game field. An example in which a player character PC is additionally placed in the game field is described later.

Figure 4:
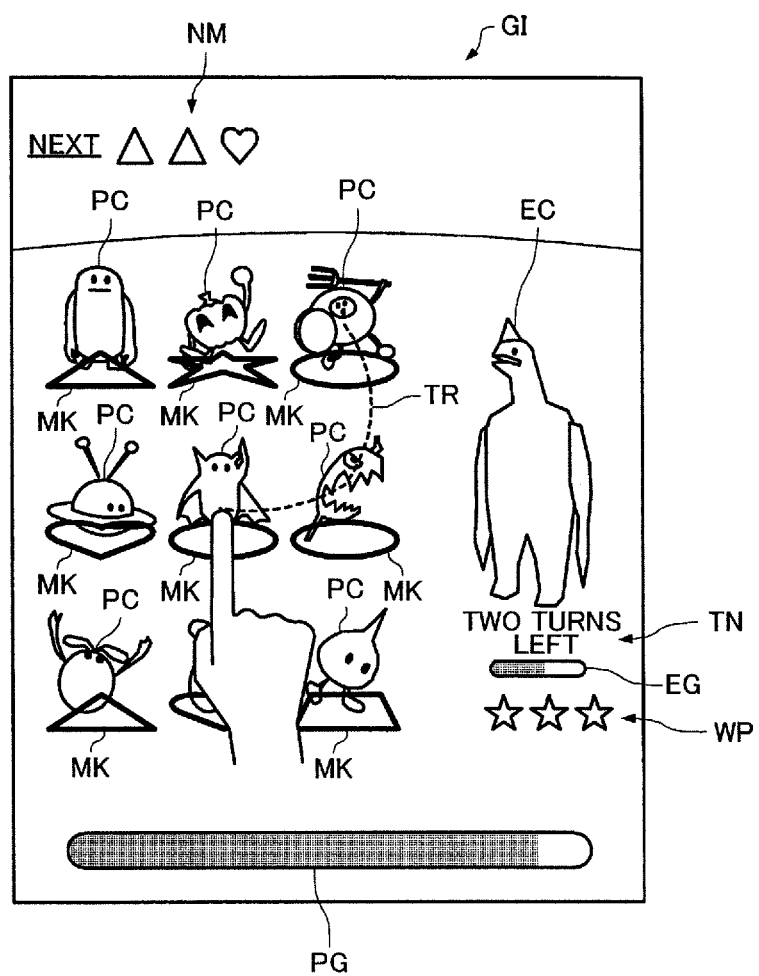
FIG. 4 illustrates a selection input that sequentially selects player characters.

The player can select the player character PC to make an attack by touching the desired player character PC within the game screen. As illustrated in FIG. 4, the player can sequentially (successively) select a plurality of player characters PC to make an attack by moving the fingertip while touching the touch panel to sequentially touch a plurality of player characters PC having the same attribute. Note that a configuration may be employed in which only player characters PC that are placed adjacent to each other in the vertical direction, the horizontal direction, or the diagonal direction can sequentially be selected, or a configuration may be employed in which the player characters PC having the same attribute that are not placed adjacent to each other can also sequentially be selected. In the example illustrated in FIG. 4, the player has moved the fingertip along a path IR to sequentially select three player character PC having the attribute "circle."

When the player character PC (one player character PC or a plurality of player characters PC having the same attribute) has been selected, it is determined that the selection allowance condition has been satisfied, and the game process that causes the selected player character PC to attack the enemy character EC, and the game effect process are performed. In the example illustrated in FIG. 4, each of three player characters PC having the attribute "circle" attack the enemy character EC. The number of remaining turns TN until the enemy character EC starts an attack is decremented by 1.

Figure 5:
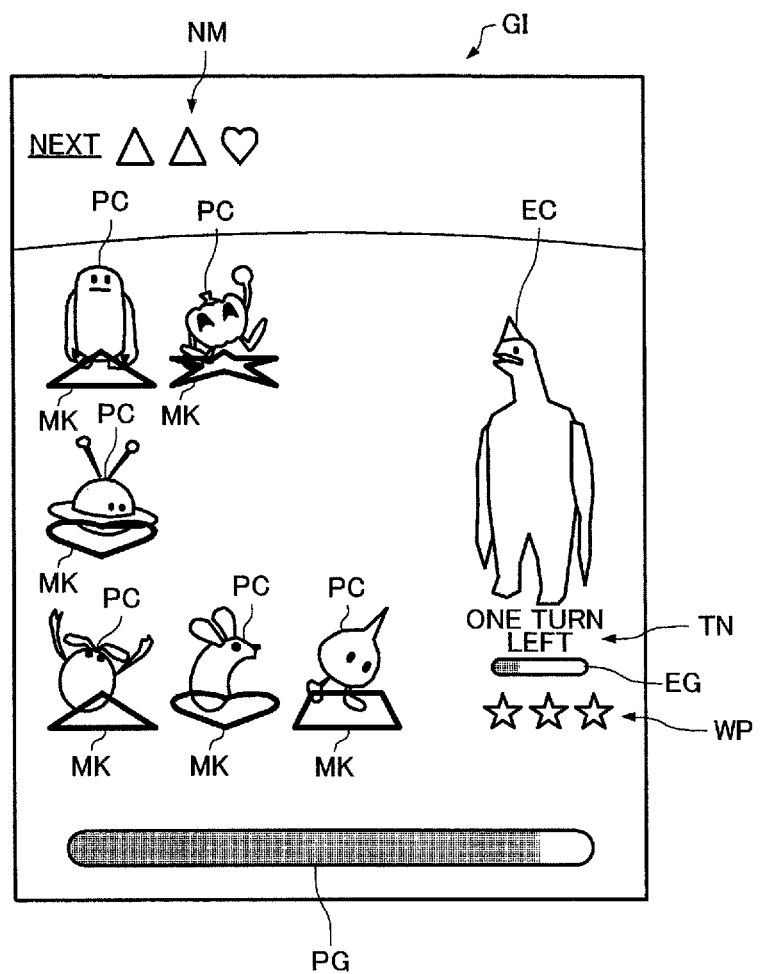
FIG. 5 illustrates an example of a game screen generated by a game system according to one embodiment of the invention.
Figure 6:
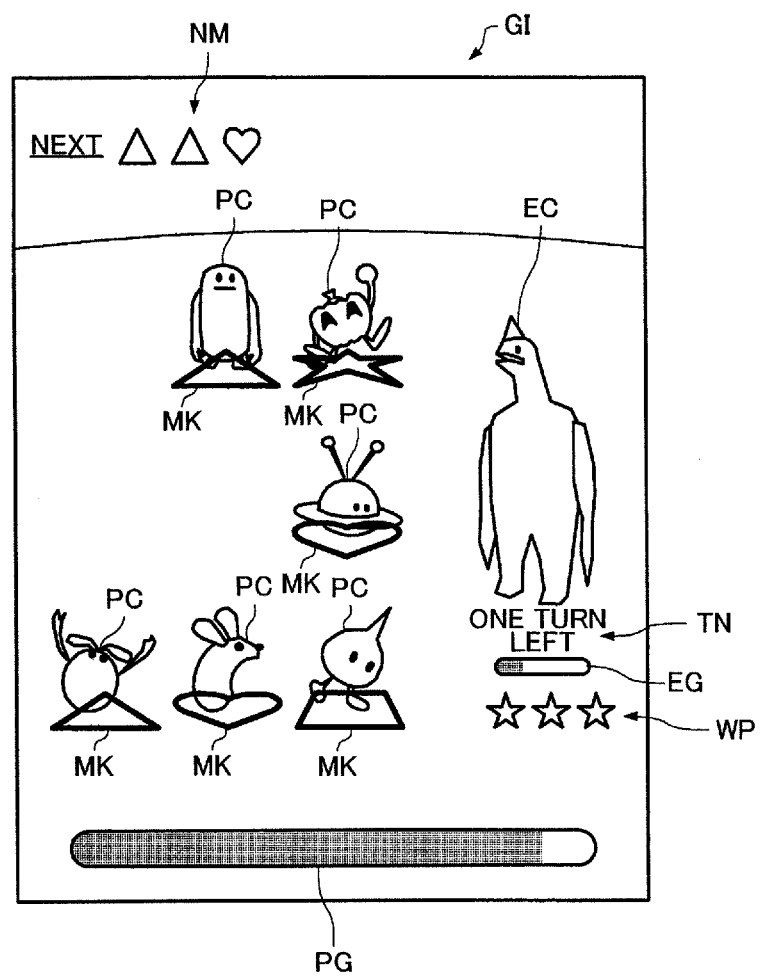
FIG. 6 illustrates an example of a game screen generated by a game system according to one embodiment of the invention.

The player characters PC that attacked the enemy character EC are deleted from the game field (see FIG. 5), and the player characters PC situated on the left side of the deleted player characters PC are shifted in the rightward direction so that the space formed by deletion of the player characters PC is filled therewith (see FIG. 6).

Figure 7:
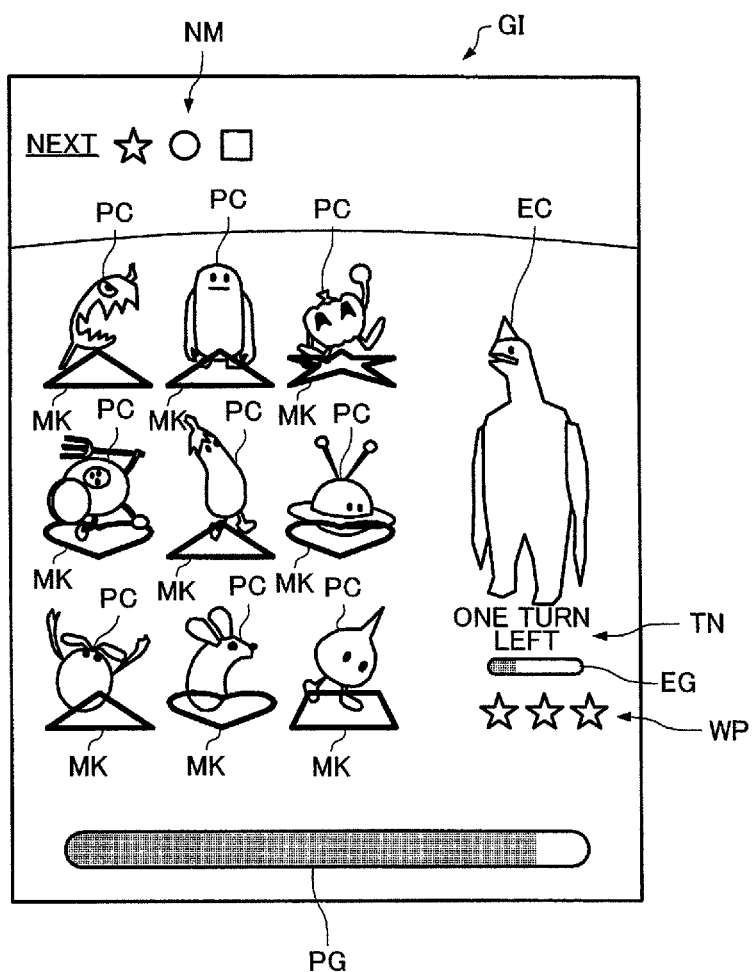
FIG. 7 illustrates an example of a game screen generated by a game system according to one embodiment of the invention.

As illustrated in FIG. 7, the same number of player characters PC as the player character PC deleted from the game field is additionally placed in the game field. In the example illustrated in FIG. 7, three player characters PC have been additionally placed in the game field. When the number of player characters that can be used by the player (that have been selected by the player as the player characters used in the game) is the same as the number (nine) of player characters placed in the game field, the player characters PC that have been deleted from the game field are additionally placed in the game field. When the number of player characters that can be used by the player is larger than the number of player characters placed in the game field, the player characters that are additionally placed in the game field are selected by a lottery from the player characters that are not placed in the game field (including the deleted player characters). Note that the player characters (among the player characters that are not placed in the game field) other than the deleted player characters may be preferentially additionally placed in the game field.

In one embodiment of the invention, the attribute of each player character that is additionally placed in the game field is determined by a lottery (i.e., a random lottery or a lottery based on a lottery table). Therefore, the attribute set to the player character may change due to deletion and addition. For example, the player character PC to which the attribute "circle" is set in FIG. 4 has another attribute (see FIG. 7) when the player character PC has been additionally placed in the game field. Since it has been determined that the attributes "triangle," "triangle," and "heart" are set to the player characters PC that are additionally placed in the game field (see FIGS. 3 to 6), the three player characters PC that have been additionally placed in the game field respectively have the attributes "triangle," "triangle," and "heart" (see FIG. 7). As described above, the attribute that is to be set to the player character PC that is additionally placed in the game field is determined in advance, and displayed as the attribute (image) NM.

In the game according to one embodiment of the invention, each player character does not have a particular attribute, and the attribute is reset each time the player character is placed in the game field. Specifically, one embodiment of the invention can realize a novel battle game in which the player attacks the enemy character by sequentially selecting the player characters having the same attribute from a plurality of player characters for which the attribute is reset each time the player character is placed in the game field. Since each character does not have a particular attribute, the player can set the desired character to be the player character without taking account of the attribute of the character.

Note that the attribute of each player character that is additionally placed in the game field need not necessarily be determined by a lottery. For example, the order of the attribute that is set to each player character that is additionally placed in the game field may be determined in advance, and the attribute may be set to each player character that is additionally placed in the game field according to the order determined in advance.

It may be determined that the selection allowance condition has been satisfied when the order of the attributes set to a plurality of player characters that have been sequentially selected matches a specific order (e.g., "circle"→"triangle"→"square"), and each of the plurality of player characters may be caused to attack the enemy character.

The player character that is additionally placed in the game field may be placed in the vicinity of the player character (that is placed in the game field) that has the same attribute as the attribute set to the player character that is additionally placed in the game field. In the example illustrated in FIG. 7, two player characters PC to which the attribute "triangle" is set are additionally placed at positions adjacent to the player character PC having the same attribute "triangle." This makes it possible for the player to easily sequentially select the player characters to which the same attribute is set.

When the player characters PC have been additionally placed in the game field, the attributes NM to be set to the player characters that are additionally placed in the game field are determined by a lottery (or according to a predetermined attribute order), and updated (see FIG. 7). Note that one attribute may be determined each time one player character PC has been additionally placed in the game field. Alternatively, the predetermined number of (e.g., 10) attributes may be determined in advance, and some of (e.g., three attributes among) the predetermined number of attributes may be displayed as the attributes NM.

When the number of remaining turns TN until the enemy character EC starts an attack is 0 (i.e., when the enemy character EC makes an attack), the game process that causes the enemy character EC to attack the player character PC, and the game effect process are performed. When the number of remaining turns TN is not 0 (i.e., when the player character PC makes an attack), the player can perform a selection input to sequentially select the player characters PC.

When the strength gauge EG of the enemy character EC has reached 0 due to an attack performed by the player character PC (i.e., when the enemy character EC has been defeated), a transition to the next stage in which a new enemy character EC appears occurs. When the final stage has been reached, and a boss character that appears in the final stage has been defeated (i.e., when the player has cleared the game), a new player character, an item, an experience value, in-game money, and the like are given to the player. The game ends when the strength gauge PG of the player character PC has reached 0 before the boss character is defeated.

The attack capability of the player character PC is calculated as described below. In the game according to one embodiment of the invention, the total attack capability is calculated by adding up the attack capability of each player character PC that has been sequentially selected by the player, and a process to attack the enemy character EC according to the total attack capability (i.e., a process that decreases the strength gauge EG of the enemy character EC) is performed. Specifically, the total attack capability increases and the amount of damage suffered by the enemy character EC increases as the number of player characters sequentially selected increases.

In one embodiment of the invention, the total attack capability varies according to the order in which the player characters are sequentially selected. For example, a coefficient $C_c$ for calculating the total attack capability is set corresponding to each combination of the player characters (see FIG. 8A), and the total attack capability is calculated based on the coefficient $C_c$ that corresponds to the combination included in the order in which the player characters have been sequentially selected. In the example illustrated in FIG. 8A, the coefficient $C_c$ is determined to be "1.5," and the total attack capability is multiplied by 1.5 when the combination of the player characters "A" and "B" is included in the order in which the player characters have been sequentially selected (i.e., when the player characters "A" and "B" have been sequentially selected in this order, or when the player characters "B" and "A" have been sequentially selected in this order). The coefficient $C_c$ is determined to be "1.2," and the total attack capability is multiplied by 1.2 when the combination of the player characters "B" and "C" is included in the order in which the player characters have been sequentially selected (i.e., when the player characters "B" and "C" have been sequentially selected in this order, or when the player characters "C" and "B" have been sequentially selected in this order). For example, when the player characters "A," "B," and "C" have been sequentially selected in this order, the coefficient $C_c$ is determined to be "1.5×1.2."

In one embodiment of the invention, the attack capability of each player character that has been sequentially selected is determined according to the order in which the player characters have been sequentially selected. For example, a coefficient $C_o$ for calculating the attack capability of each player character is set corresponding to the selection order (see FIG. 8B), and the attack capability of each player character is calculated based on the coefficient $C_o$ that corresponds to the selection order. In the example illustrated in FIG. 8B, the attack capability of the player character that has been selected first is multiplied by 0.7, the attack capability of the player character that has been selected thereafter is multiplied by 1.0 (i.e., the attack capability does not change), and the attack capability of the player character that has been selected thereafter is multiplied by 1.3.

For example, when the coefficient $C_c$ and the coefficient $C_o$ are set as illustrated in FIGS. 8A and 8B, and the player characters "A," "B," and "C" have been sequentially selected in this order, the total attack capability $S_s$ is calculated by the following expression. Note that $S_a$ is the original attack capability of the player character "A," $S_b$ is the original attack capability of the player character "B," and $S_c$ is the original attack capability of the player character "C."

$$S_s=((S_a\times0.7)+(S_b\times1.0)+(S_c\times1.3))\times1.5\times1.2$$

When the player characters "A," "C," and "B" have been sequentially selected in this order, the total attack capability $S_s$ is calculated by the following expression.

$$S_s=((S_a\times0.7)+(S_c\times1.0)+(S_b\times1.3))\times1.0\times1.2$$

Specifically, the player can increase the total attack capability, and increase the amount of damage suffered by the enemy character EC by successively selecting the combination of player characters that corresponds to a large coefficient $C_c$ (two player characters with good compatibility) so that the player character with a high attack capability is selected last.

The attack capability of each player character that has been sequentially selected may be determined according to the number of turns that have elapsed until each player character has been selected after each player character was placed in the game field. For example, the attack capability of the player character may be increased as the number of turns that have elapsed (i.e., the number of turns in which the player character has been in the game field without being selected) increases. This makes it possible for the player to perform strategic game play (e.g., reserve the player character with a high attack capability until the final stage (in which the player battles with the boss character) is reached).

In one embodiment of the invention, the attribute of the player character is reset each time the player character is placed in the game field. The attack capability of the player character may be increased when the same attribute has been successively set to the player character for the predetermined number of times. When the same attribute has been successively set to the player character for the predetermined number of times, a bonus may be given to the player (e.g., the same attribute is set to all of the player characters placed in the game field in the next turn).

The attack capability of each player character that has been sequentially selected may be determined according to the attribute set to each player character. For example, the attribute that increases the attack capability may be specified for each player character, and the attack capability of the player character that has been selected may be increased when the attribute that increases the attack capability is set to the player character. The attribute that increases the attack capability may be set to the player character that is to be additionally placed in the game field when the number of player characters that have been sequentially selected is equal to or larger than the predetermined number (e.g., when five or more player characters having the same attribute have been sequentially selected).

The total attack capability may be calculated (increased or decreased) based on the direction in which a fingertip has been moved when selecting the last player character when the player has sequentially selected the player characters to attack the enemy character. A guide image that indicates the direction in which the player should move a fingertip when selecting the last character in order to increase the attack capability may be displayed within the game screen. When a plurality of enemy characters are placed in the game field, an attack may be made on an enemy character among the plurality of enemy characters that is situated in the direction in which the player has moved a fingertip after selecting the last player character.

Figure 9:
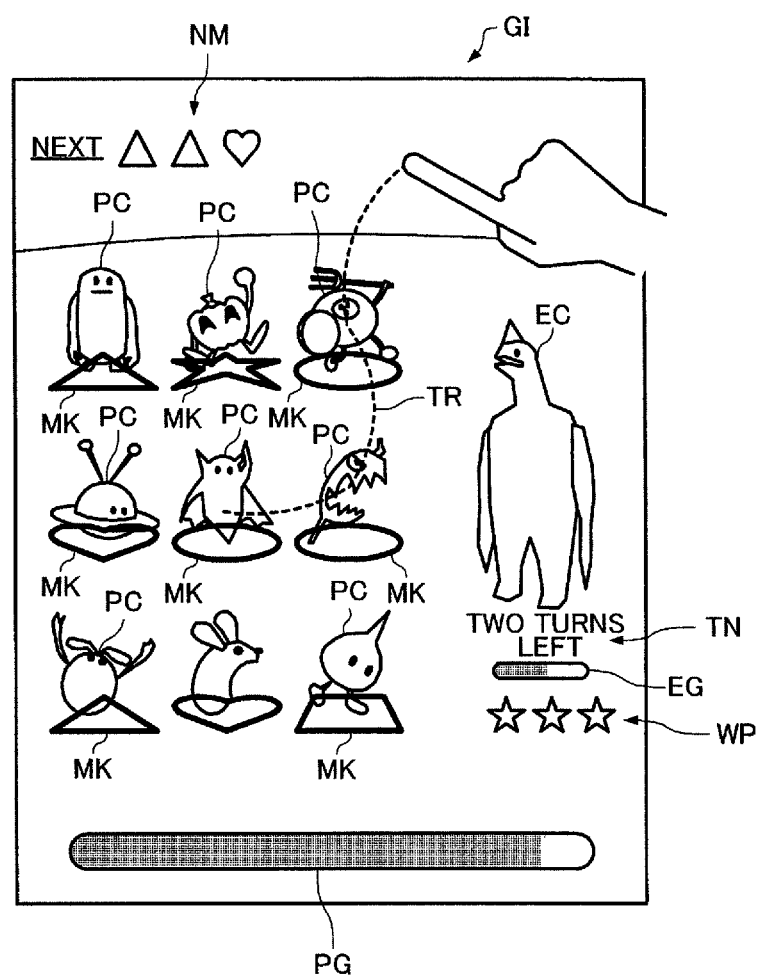
FIG. 9 illustrates cancellation of selection of player characters.

As illustrated in FIG. 9, when the player has performed an operation to designate an area in which no player character PC is present after sequentially selecting the player characters PC (e.g., an operation to move a fingertip in contact with the touch panel to an area in which no player character PC is present), selection of the player characters PC may be cancelled. In this case, the selected player character PC does not make an attack, and the player can select the player characters PC again.

When the same attribute has been successively set to the same player character for the predetermined number of times, or when the number of player characters that have been sequentially selected is equal to or larger than the predetermined number (i.e., when a given game condition has been satisfied during the battle game), the attribute NM that is to be set to the player character PC that is to be additionally placed in the game field may be changed.

As illustrated in FIG. 3, an attribute WP that is a weak point of the enemy character EC is displayed within the game screen GI. In the example illustrated in FIG. 3, three "star" marks are displayed in the vicinity of the enemy character EC as the attribute WP. The defense capability of the enemy character EC increases when the attribute WP is displayed, and the amount of decrease in the strength gauge EG due to an attack by the player character PC decreases (or the strength gauge EG does not decrease). The "star" mark (attribute WP) is deleted when the player character PC having the "star" attribute makes an attack. When all of the "star" marks have been deleted, the defense capability of the enemy character EC is returned to the normal level (i.e., the defense capability of the enemy character EC decreases).

3. Process

Figure 10:
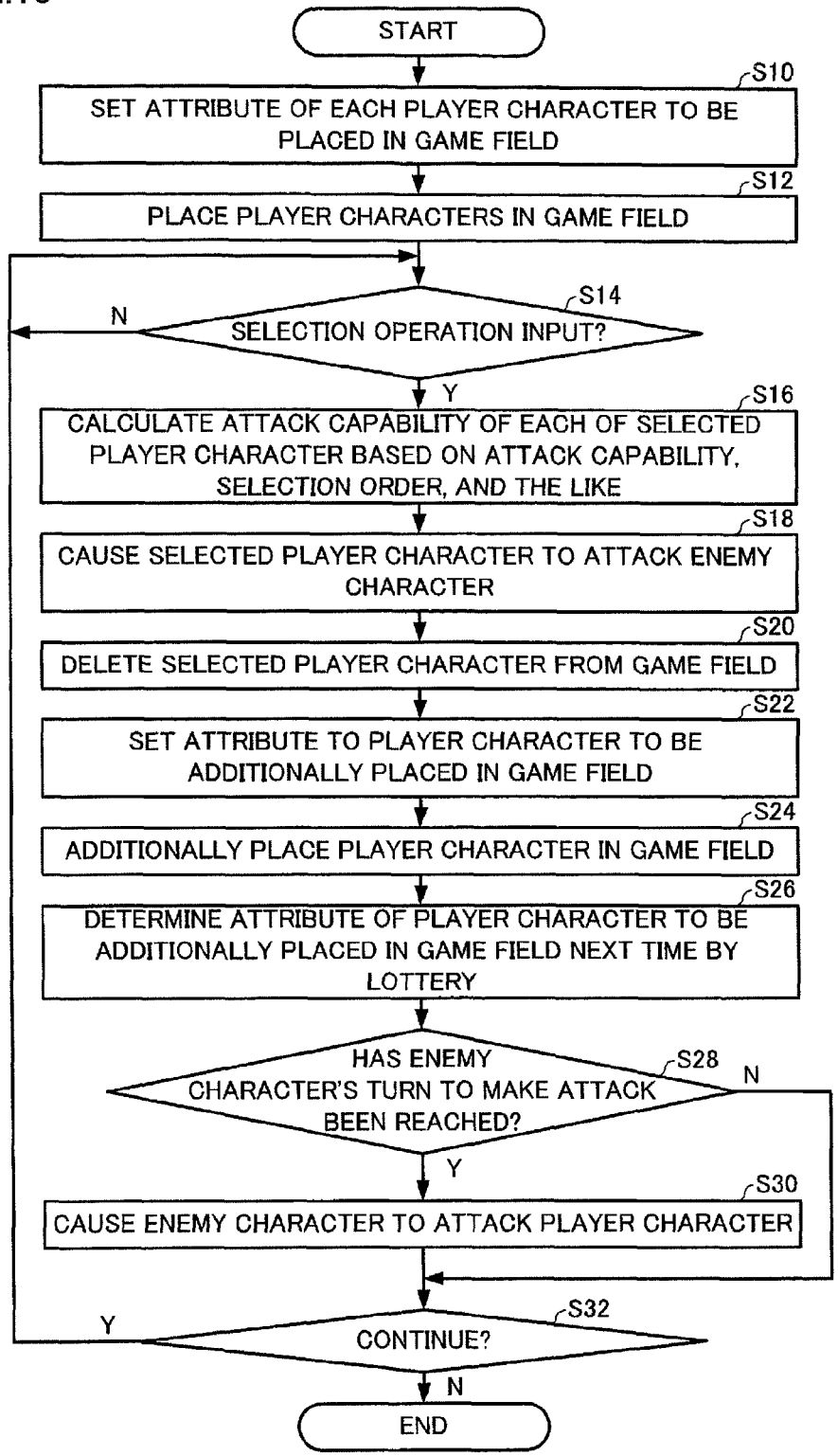
FIG. 10 is a flowchart illustrating the flow of a process according to one embodiment of the invention.

An example of the process performed by the game system according to one embodiment of the invention is described below with reference to FIG. 10 (flowchart).

The attribute setting section 112 sets an attribute of each player character to be placed in the game field (step S10). The attribute set to each player character to be placed in the game field may be determined by a lottery.

The placement section 110 places a plurality of player characters to which the attribute has been set in the game field (step S12). The display control section 118 displays an image (attribute mark) that represents the attribute set to each player character placed in the game field so that the image is linked to each player character.

The attack execution section 114 determines whether or not the player has performed an operation input to sequentially select the player characters having the same attribute (or an operation input to select one player character) (step S14). When the attack execution section 114 has determined that the player has performed the operation input ("Y" in step S14), the attack execution section 114 determines that the selected player characters satisfy the selection allowance condition, and calculates the attack capability of each of the selected player characters based on the attack capability and the attribute of each player character, the selection order, and the number of turns that have elapsed after placement in the game field (step S16).

The attack execution section 114 performs the game process that causes each of the selected player character to attack the enemy character based on the calculated attack capability of each player character, and performs the game effect process (step S18). The deletion section 116 deletes the selected player character (i.e., the player character that has attacked the enemy character) from the game field (step S20).

The attribute setting section 112 sets an attribute of each player character to be additionally placed in the game field (i.e., the same number of the player character as the player character deleted from the game field) (step S22).

The placement section 110 additionally places the player characters to which the attribute has been set in the game field (step S24). The display control section 118 displays an image (attribute mark) that represents the attribute set to each player character additionally placed in the game field so that the image is linked to each player character.

The attribute setting section 112 determines an attribute of the player character to be additionally placed in the game field next time by a lottery (step S26). The determined attribute is displayed within the game screen GI as the attribute NM (see FIG. 3), and is set to the player character in the step S22 for the next additional placement.

The attack execution section 114 determines whether or not the enemy character's turn to make an attack has been reached (step S28). When the attack execution section 114 has determined that the enemy character's turn to make an attack has been reached ("Y" in step S28), the attack execution section 114 performs the game process that causes the enemy character to attack the player character, and performs the game effect process (step S30). When the attack execution section 114 has determined that the enemy character's turn to make an attack has not been reached ("N" in step S28), the step S32 is performed.

The processing section 100 determines whether or not the strength value of the enemy character and the strength value of the player character are 0 (step S32). When the processing section 100 has determined that the strength value of the enemy character and the strength value of the player character are not 0 ("Y" in step S32), the processing section 100 repeats the process from the step S10 until the strength value of the enemy character or the strength value of the player character becomes 0.

4. Modifications

The invention is not limited to the above embodiments. Various modifications and variations may be made of the above embodiments. Any term cited with a different term having a broader meaning or the same meaning in the specification and the drawings may be replaced by the different term in any place in the specification and the drawings.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A non-transitory computer-readable information storage medium for implementing a battle game in which a player character selected by a player attacks an enemy character, the information storage medium storing a program that causes a computer to function as:
   a placement section that places a player character among a predetermined number of player characters in a character selection area, for selection from the character selection area responsive to an operation input performed by the player;
   an attribute setting section that sets an attribute of each player character that is placed in the character selection area;
   an attack execution section that determines whether or not a plurality of player characters sequentially selected from the player characters placed in the character selection area satisfy a selection allowance condition that is set based on the attribute when the operation input that sequentially selects the plurality of player characters has been performed, and causes each of the plurality of player characters to make an attack according to the attribute when it has been determined that the selection allowance condition is satisfied; and
   a deletion section that deletes a player character that has attacked the enemy character from the character selection area,
   the placement section selecting the same number of player character as the player character deleted from the character selection area from the predetermined number of player characters excluding the player characters placed in the character selection area, and additionally placing the selected player character in the character selection area, wherein there are a plurality of player characters deleted from the character selection area,
   the placement section placing the player characters that are additionally placed in the character selection area at positions in the vicinity of a player character that already exists in the character selection area and has a same attribute as the attribute set to the player characters that are additionally placed in the character selection area, and
   the attribute setting section setting an attribute to each player character that is additionally placed in the character selection area according to a given rule.

2. The non-transitory information storage medium as defined in claim 1,
   wherein the attack execution section changes an attack capability of each of the plurality of player characters that have been sequentially selected according to an order in which the plurality of player characters have been sequentially selected.

3. The non-transitory information storage medium as defined in claim 2,
   wherein the attack execution section calculates an attack capability of each of the plurality of player characters that have been sequentially selected according to the number of turns that have elapsed until each of the plurality of player characters has been selected after each of the plurality of player characters was placed in the character selection area.

4. The non-transitory information storage medium as defined in claim 3,
   wherein, when the same attribute has been successively set to the same player character for a predetermined number of times, the attack execution section increases an attack capability of the player character.

5. The non-transitory information storage medium as defined in claim 2,
   wherein, when the same attribute has been successively set to the same player character for a predetermined number of times, the attack execution section increases an attack capability of the player character.

6. The non-transitory information storage medium as defined in claim 1,
   wherein the attack execution section calculates an attack capability of each of the plurality of player characters that have been sequentially selected according to the number of turns that have elapsed until each of the plurality of player characters has been selected after each of the plurality of player characters was placed in the character selection area.

7. The non-transitory information storage medium as defined in claim 6,
   wherein, when the same attribute has been successively set to the same player character for a predetermined number of times, the attack execution section increases an attack capability of the player character.

8. The non-transitory information storage medium as defined in claim 1,
   wherein, when the same attribute has been successively set to the same player character for a predetermined number of times, the attack execution section increases an attack capability of the player character.

9. The non-transitory information storage medium as defined in claim 1,
   wherein an attribute that increases an attack capability is specified for each player character, and
   the attribute setting section sets the attribute that increases the attack capability to the player character that is additionally placed in the character selection area when the number of player characters that have been sequentially selected is equal to or larger than the predetermined number of player characters.

10. The non-transitory information storage medium as defined in claim 1,
    wherein the attack execution section cancels selection of the plurality of player characters when an operation input that designates a position at which no player character is present has been performed after the plurality of player characters have been sequentially selected.

11. The non-transitory information storage medium as defined in claim 1,
    wherein the program causes the computer to further function as: a display control section that displays a predetermined number of attributes that are to be set to the player characters that are additionally placed in the character selection area in advance, and the attribute setting section changes the displayed attributes and/or the attributes to be set when a given game condition has been satisfied during the battle game.

12. A game system that implements a battle game in which a player character selected by a player attacks an enemy character, the game system comprising:
a placement section that places a player character among a predetermined number of player characters in a character selection area, for selection from the character selection area responsive to an operation input performed by the player;
an attribute setting section that sets an attribute of each player character that is placed in the character selection area;
an attack execution section that determines whether or not a plurality of player characters sequentially selected from the player characters placed in the character selection area satisfy a selection allowance condition that is set based on the attribute when the operation input that sequentially selects the plurality of player characters has been performed, and causes each of the plurality of player characters to make an attack according to the attribute when it has been determined that the selection allowance condition is satisfied; and
a deletion section that deletes a player character that has attacked the enemy character from the character selection area,
the placement section selecting the same number of player character as the player character deleted from the character selection area from the predetermined number of player characters excluding the player characters placed in the character selection area, and additionally placing the selected player character in the character selection area, wherein there are a plurality of player characters deleted from the character selection area,
the placement section placing the player characters that are additionally placed in the character selection area at positions in the vicinity of a player character that already exists in the character selection area and has a same attribute as the attribute set to the player characters that are additionally placed in the character selection area, and
the attribute setting section setting an attribute to each player character that is additionally placed in the character selection area according to a given rule.

13. The game system, as defined in claim 12, wherein the attack execution section cancels selection of the plurality of player characters when an operation input that designates a position at which no player character is present has been performed after the plurality of player characters have been sequentially selected.

* * * * *